United States Patent [19]

Goodwater et al.

[11] Patent Number: 5,554,837

[45] Date of Patent: Sep. 10, 1996

[54] INTERACTIVE LASER WELDING AT ELEVATED TEMPERATURES OF SUPERALLOY ARTICLES

[75] Inventors: Frank Goodwater, Reno; Lang D. Huynh, Carson City; David S. Kang, Carson City; Hon Li, Carson City; James M. Lizotte, Reno; Brian G. Doyle, Gardnerville, all of Nev.

[73] Assignee: Chromalloy Gas Turbine Corporation, San Antonio, Tex.

[21] Appl. No.: 116,670

[22] Filed: Sep. 3, 1993

[51] Int. Cl.[6] ............................................. B23K 26/08
[52] U.S. Cl. .......................... 219/121.63; 219/121.64; 219/121.83
[58] Field of Search ................... 219/121.63, 121.64, 219/121.78, 121.79, 121.8, 121.81, 121.82, 121.83, 121.84, 121.86, 610, 635; 228/262.3, 232; 148/224, 525, 526, 511

[56] References Cited

U.S. PATENT DOCUMENTS

| | | | |
|---|---|---|---|
| 3,246,392 | 4/1966 | Altgelt | 29/402 |
| 3,535,768 | 10/1970 | Pruitt et al. | 29/471.1 |
| 3,619,547 | 11/1971 | Cavagnero | 219/104 |
| 3,660,882 | 5/1972 | Widowitz et al. | 29/156.8 B |
| 4,402,447 | 9/1983 | Przybyszewski et al. | |
| 4,498,617 | 2/1985 | Guertin et al. | 228/119 |
| 4,576,874 | 3/1986 | Spengler et al. | |
| 4,611,744 | 9/1986 | Fraser et al. | 228/119 |
| 4,613,744 | 9/1986 | Fraser et al. | 219/200 |
| 4,675,204 | 6/1987 | Nicoll et al. | |
| 4,675,502 | 6/1987 | Haefner et al. | 219/124.34 |
| 4,733,049 | 3/1988 | Lemelson | 219/121.79 |
| 4,737,613 | 4/1988 | Frye | 219/121.82 |
| 4,804,815 | 2/1989 | Everett | 219/121.6 |
| 4,918,805 | 4/1990 | Liszka et al. | 29/888.06 |
| 4,998,005 | 3/1991 | Rathi et al. | 219/121.83 |
| 5,106,010 | 4/1992 | Stueber et al. | 228/232 |
| 5,160,822 | 11/1992 | Aleshin | 219/121.64 |
| 5,168,141 | 12/1992 | Tashjian et al. | 219/121.63 |
| 5,208,431 | 5/1993 | Uchiyama et al. | 219/121.63 |
| 5,224,997 | 7/1993 | Grilloud et al. | 118/667 |
| 5,225,247 | 7/1993 | Dotsch et al. | 427/294 |
| 5,229,571 | 7/1993 | Neiheisel | 219/121.63 |

OTHER PUBLICATIONS

"Blade Repair Time Cut In Half", Oct. 1992, Industrial Laser Review, 11, 13.
"CNC Laser System", Multi Axis CNC Laser System, 5 Axis CNC Laser System, S. E. Huffman Corp., 1050 Huffman Way, Clover, SC 29710, published prior Sep. 3, 1993.
Welding Handbook, Seventh Edition, vol. 4 Metals And Their Weldability, W. H. Kearns, Editor, 1982 pp. 232–237.

Primary Examiner—Teresa J. Walberg
Assistant Examiner—Gregory L. Mills
Attorney, Agent, or Firm—Mitchell D. Bittman

[57] ABSTRACT

A process and apparatus is provided for laser welding a nickel and/or cobalt based superalloy article comprising: preheating the entire weld area and adjacent region to a ductile temperature with an induction heat coil and maintaining such temperature during welding and solidification of the weld; and welding the preheated article utilizing a laser with a powder alloy feed with a control means controlling the laser, power feed and motion system on which the article is fixtured, wherein the control means includes a vision system which digitizes the weld area providing a path for the laser welding to follow.

25 Claims, 5 Drawing Sheets

INTERACTIVE LASER WELDING AT ELEVATED TEMPERATURES OF SUPERALLOY ARTICLES

The present invention relates to a process for welding superalloy articles which are difficult to weld, and more particularly to a process for laser welding such articles.

As jet engine components are developed there is a continuing demand for improved capability to withstand increasingly higher temperatures due to the high temperature demands placed upon these components in the engine. Today's high pressure turbine blades and vanes are subjected to extremely adverse high temperature conditions (e.g. greater than 2000° F.). These jet engine parts may require welding processes during the manufacture of the components, or after seeing engine operations and require repair as a result of wear and cracking.

As a result of these high temperature demands these components often are manufactured from superalloys containing a gamma-prime phase and materials commonly known as the MCrAlY family of alloys. One particular problem with the gamma-prime precipitation hardenable alloys such as R'80 is the inability to weld or clad these alloys with like or similar alloys without encountering cracking and high production rejects.

Because of the welding temperatures and stresses involved, these alloys encounter shrinkage, stress cracking and the like. Due to the difficulties in welding these specific superalloys, there is a need for a process by which gamma-prime precipitation hardened alloys and the MCrAlY family of alloys can be welded consistently without cracking with similar or parent metal alloys. U.S. Pat. No. 5,106,010 discloses such a temperature and maintains such temperature during welding and solidification. There is a need to be able to carry out this process in an efficient and automated basis to maximize reproduceability and minimize rejects and waste while increasing throughput of welded components.

SUMMARY OF THE INVENTION

Briefly, this invention provides a process and apparatus for laser welding a nickel and/or cobalt based superalloy article either having a gama prime phase or being from the McrAlY family of alloys comprising preheating the entire weld area and region adjacent to the weld area of the article to a ductile temperature within the range of 1400° F. to 2100° F. with an induction heat coil and maintaining such temperature during welding and solidification of the weld; and welding the preheated article utilizing a laser with a powder alloy feed, with a control means which controls the laser, powder feed and a motion system on which the article is fixtured, wherein the control means includes a vision system which digitizes the weld area of article providing a path for the laser welding to follow.

BRIEF DESCRIPTION OF THE DRAWINGS

Other features and advantages of the present invention will become apparent when the following description is read in conjunction with the accompanying drawings in which.

DETAILED DESCRIPTION OF THE INVENTION

This invention provides a process for welding superalloy articles, particularly gas turbine engine components including blades, vanes and rotors. The superalloys are nickel and/or cobalt based superalloys which are difficult to weld by state-of-the-art processes. These superalloys have a gamma-prime phase and include directionally solidified and single crystal alloys of gamma-prime nickel base precipitation hardened alloys, as well as the MCrAlY family of alloys wherein M represents at least one metal chosen from the group consisting of Ni or Co, such as NiCoCrAlY and NiCrAlY alloys. Generally, the gamma-prime precipitation-strengthened superalloys contain titanium and aluminum in a combined amount of at least about 5%. Suitable superalloys include R'80, DSR'80h, R'108, R'125, DSR'142, R'N4, R'N5 Mar-M-247DS, In 792Hf, and CMX-⅔. The following Table I identifies the nominal composition of some of these superalloys.

TABLE I

| | CHEMICAL COMPOSITION (Weight %): Ni BASE SUPERALLOY | | | | | | |
| --- | --- | --- | --- | --- | --- | --- | --- |
| | ALLOY | | | | | | |
| ELEMENT | R'80 | DSR'80H | R'108 | R'125Hf | DSR'142 | R'N4 | R'N5 |
| Aluminum [Al] | 2.8–3.2% | 3.0% | 5.25–5.75% | 4.8% | 6.00–6.30% | 4.10–4.30% | 6.00–6.40% |
| Chromium [Cr] | 13.7–14.3% | 14.0% | 8.00–8.70% | 9.0% | 6.60–7.00% | 9.50–10.00% | 6.75–7.25% |
| Cobalt [Co] | 9.0–10.00% | 9.0% | 9.00–10.00% | 10.0% | 11.70–12.30% | 7.0–8.00% | 7.0–8.00% |
| Molybdenum [Mo] | 3.7–4.3% | 4.0% | 0.40–0.60% | 2.0% | 1.30–1.70% | 1.30–1.70% | 1.30–1.70% |
| Tungsten [W] | 3.7–4.3% | 4.0% | 9.30–9.70% | 7.0% | 4.70–5.10% | 5.75–6.25% | 4.75–5.25% |
| Tantalum [Ta] | 0.10% max. | — | 2.80–3.30% | 3.8% | 6.2–6.5% | 4.60–5.00% | 6.30–6.70% |
| Titanium [Ti] | 4.80–5.20% | 4.7% | 0.60–0.90% | 2.6% | 0.02% max. | 3.35–3.65% | 0.02% max. |
| Hafnium [Hf] | 0.10% max. | 0.8% | 1.30–1.70% | 1.6% | 1.30–1.70% | 0.10–0.20% | 0.12–0.18% |
| Rhenium [Re] | — | — | — | — | 2.60–3.00% | — | 2.75–3.25% |
| Carbon [C] | 0.15–0.19% | 0.16% | 0.07–0.10% | 0.10% | 0.10–0.14% | 0.05–0.07% | 0.04–0.06% |
| Zirconium [Zr] | 0.02–0.10% | 0.01% | 0.005–0.02% | 0.05% | 0.015–0.03% | 0.020% max. | 0.010% max. |
| Boron [B] | 0.01–0.02% | 0.015% | 0.01–0.02% | 0.015% | 0.01–0.02% | 0.003–0.005% | 0.003–0.005% |
| Nickel [Ni] | Balance | Balance | Balance | Balance | Balance | Balance | Balance |
| Other | W + Mo = 7.70% min. | | | | | Cb 0.4–0.6% | Al + Ta = 12.45% min. |

Figure 1:
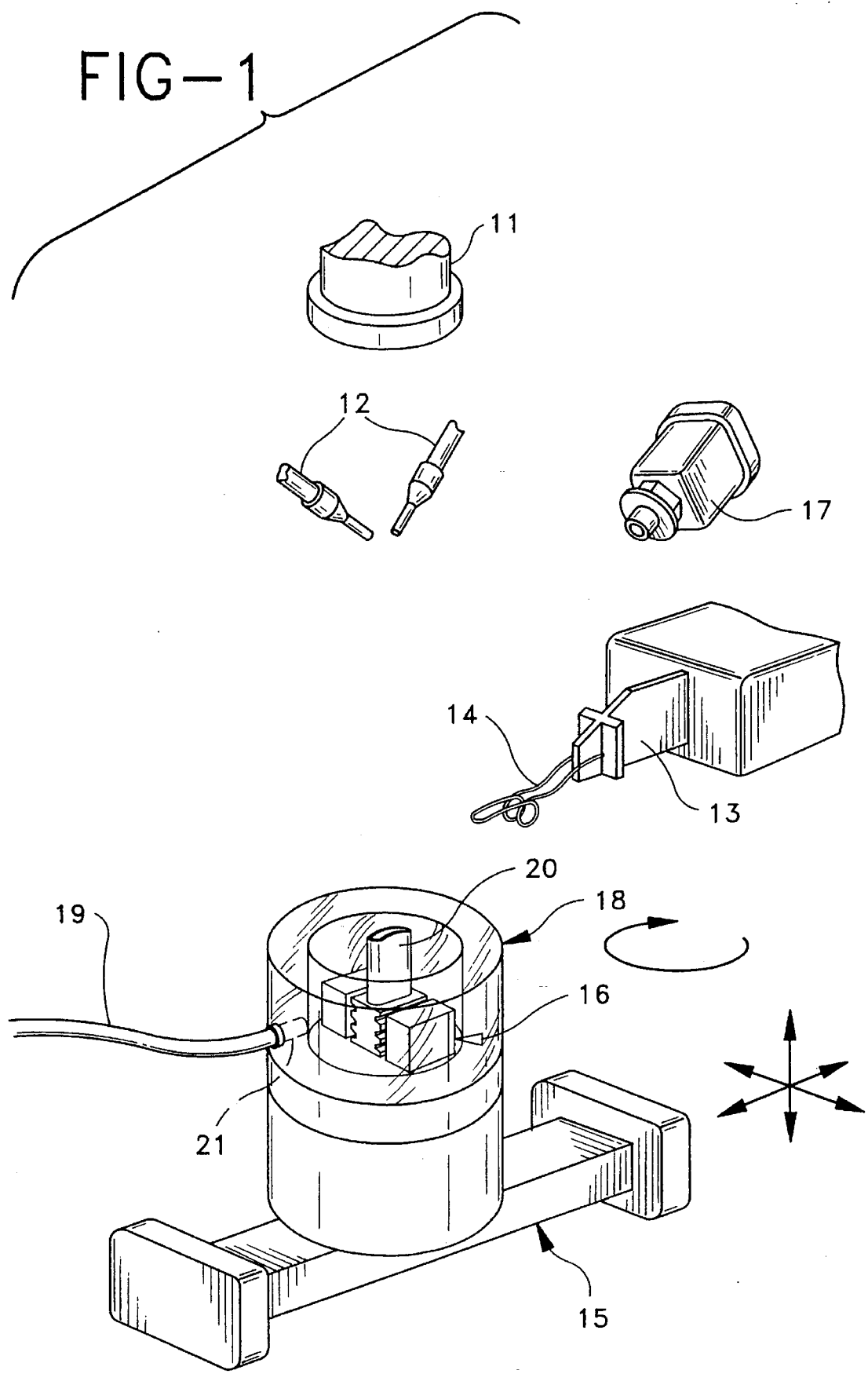
FIG. 1 shows the laser welding system in which the components are not engaged.

Referring first to FIG. 1, the system of the invention identified generally by reference numeral 10, is comprised of a laser 11 with a powder feed 12, an induction heater 13 with its induction heating coil 14 and a motion system 15 on which the article 20 is fixtured. The article is fixtured by mounting on a stage 16 in a very precise manner utilizing a clamp, as is conventional. A pyrometer 17 and an inert gas shroud (shield) 18 with an inert gas feed line 19 and gas diffuser 21 are also shown.

Figure 2:
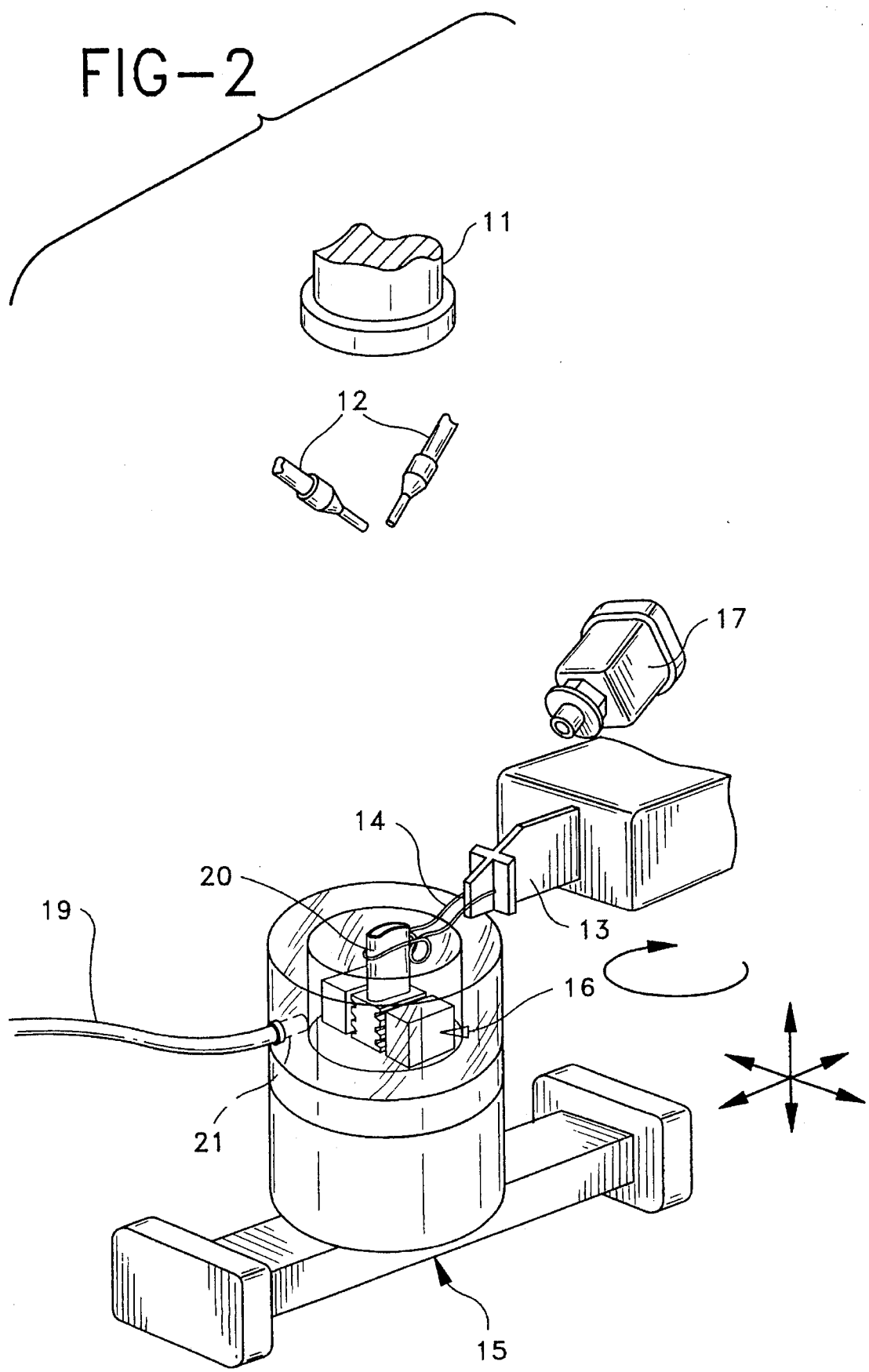
FIG. 2 shows the laser welding system during preheating of a blade tip.

As shown in FIG. 2, the article 20 (e.g. a vane or blade) is preheated by an induction heating coil 14. At this stage the laser 11 and powder feed 12 are not engaged. During this preheating stage the entire weld area of the superalloy article and region adjacent to the weld area is heated by the induction heating coil 14 to a ductile temperature within the range of 1400° F. to 2100° F. preferably 1725° F. to 1975° F. The ductile temperature to which the weld area of the article is heated is above the aging or precipitation hardening temperature, but below the incipient melting temperature of the particular superalloy article substrate. Critical to this process is to maintain thermal equilibrium before, during and after the welding/cladding process, leading to less severe thermal gradients across the weld/adjacent base metal thus reducing residual stresses and subsequent cracking. The reduction of thermal gradients lessens the impact of the heat from welding on the heat affected zone, i.e. the process "relocates" the heat affected zone away from the fusion line. Since the entire weld area and adjacent region is preheated above the precipitation hardening temperature, this results in a uniform thermal distribution that precludes the contraction and resultant residual stresses that are normally focused at the weaker heat affected zone. The entire weld area and adjacent region undergoes thermal contraction as a result of the aging reaction with the residual stresses that result from this reaction being distributed over a much larger area, not only concentrated in the spot being welded.

The entire weld area and region adjacent to the weld are heated, by induction heating, to the ductile temperature. The region adjacent to the weld area being heated is at least sufficiently large to be able to encompass the heat affected zone, preferably larger. The heat affected zone is defined as that portion of the base metal which has not been melted, but whose mechanical properties or microstructure have been altered by the heat of welding (see Metals Handbook Ninth Edition, Volume 6, ASM, 1983). Generally this adjacent region being heated is at least 0.25 inches preferably 0.5 to 1 inch from the weld.

Figure 3:
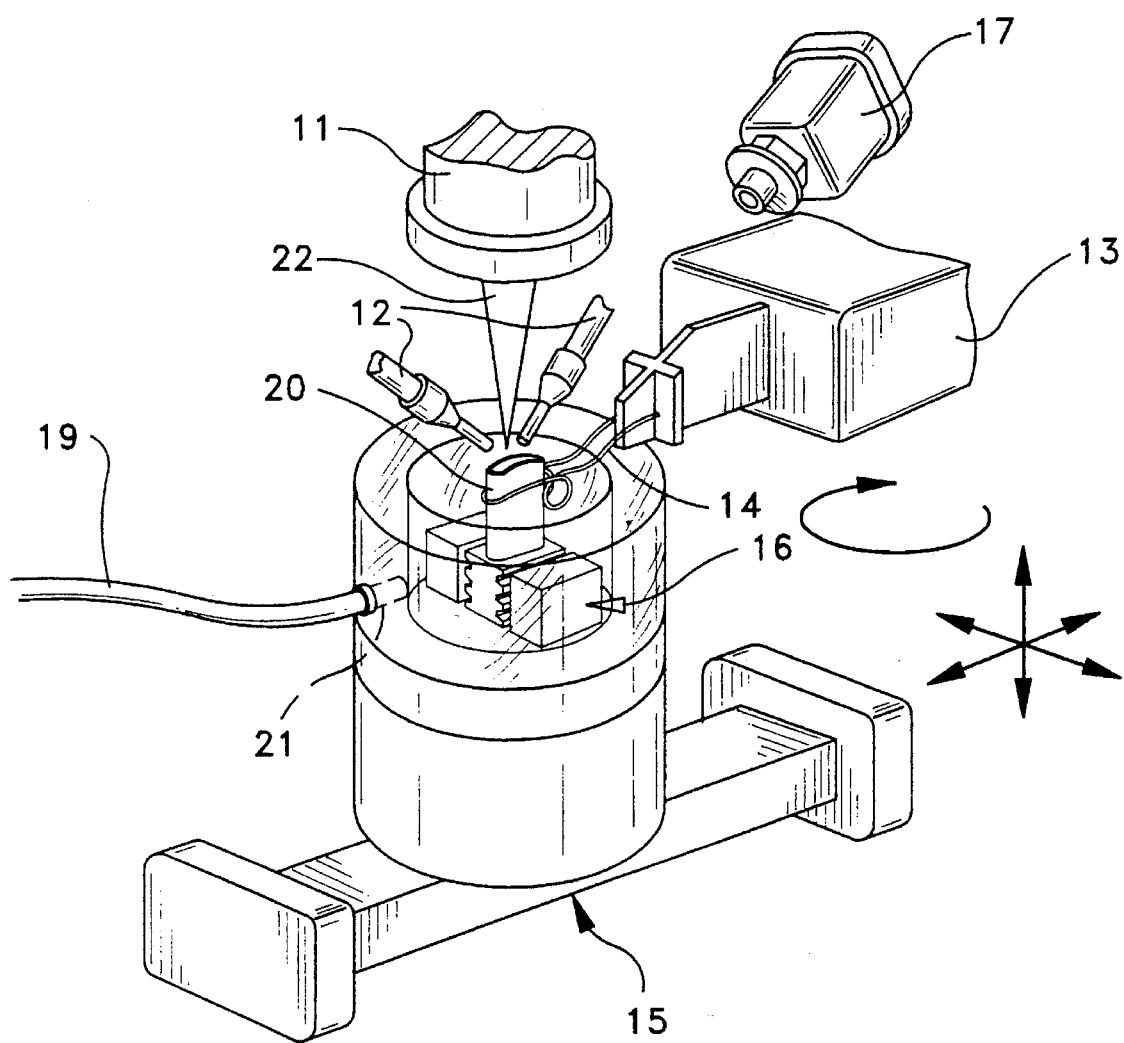
FIG. 3 shows the laser welding system with the laser and powder feed engaged for welding.

Once the article has been preheated to the desired temperature the laser 11 and powder feed 12 are engaged for welding as shown in FIG. 3. The radiation 22 from the laser 11 forms a small molten pool of the substrate as the powder from the powder feed 12 is dispersed over the molten pool and welded (clad) to the part by the laser beam 22. The solidification process is precisely controlled by the radiation of the beam and the heating energy imparted by the induction coil and relative movement of the beam and the article to control the thermal and resulting strains and stresses to form a crack-free weld during and after the solidification process. During operation, the article weld area is shrouded in an inert gas (e.g. argon on helium) supplied to shroud 18 by feed line 19 and gas diffuser 21, in order to minimize the oxidation and oxide contamination of the base superalloy and filler metal alloy powder during the heating and welding process.

The temperature of the weld area is controlled throughout the process in spite of added heat from the laser beam by using an optical pyrometer 17 with feedback voltage loop (inferometer) controlling the induction heater 13. The part is preheated in the 1400° F. to 2100° F. range and remains in this range during welding and solidification despite localized laser heat input. In addition, the inferometer (feedback loop) controls the ramp up (heat up) rate prior to welding and the ramp down (cool down) once welding has been completed. This preheating process reduces stresses and cracking from welding and allows the base superalloy article to be laser welded (clad) with a powder alloy feed which also comprises a superalloy, i.e. a gama-prime precipitation strengthened superalloy or an MCrAlY alloy. Advantageously a powder alloy can be utilized which is substantially the same as the alloy of the superalloy article. The reduction of stresses and cracking therefrom is especially needed when welding a directionally solidified superalloy with a gama prime strengthened powder alloy due to the susceptibility for cracking along grain boundaries.

Figure 4:
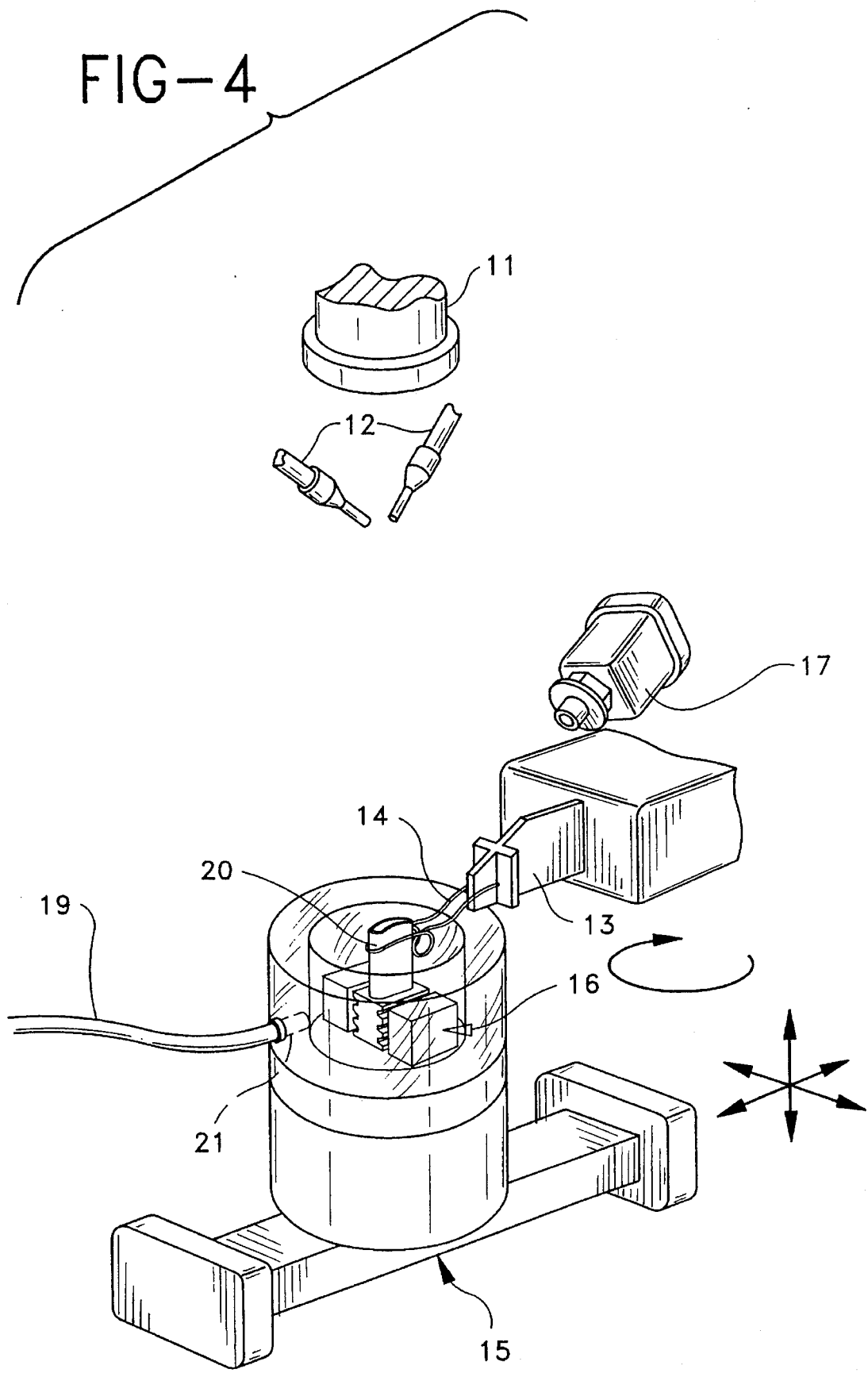
FIG. 4 shows the laser welding system during cooling with the laser and powder feed not engaged.

In FIG. 4 is shown that the laser 11 and powder feed 12 are disengaged during the cooling cycle, but the induction coil 14 is maintained in place to control the ramp down of the superalloy article. Generally it is preferred to control the cooling to reduce stresses induced by uncontrolled cooling which can induce cracking.

Figure 5:
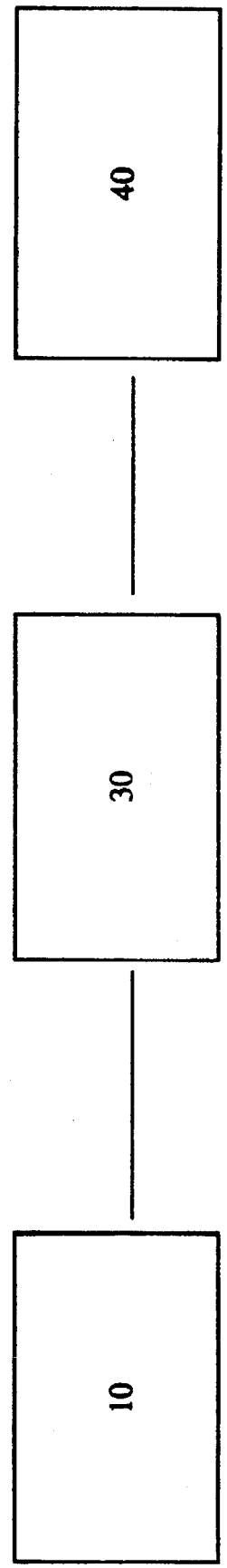
FIG. 5 is a block diagram showing the control means for laser welding.

The laser welding of the article is controlled through use of a computer numerical control (CNC) means "30, as shown in FIG. 5" which controls the laser, powder feed and motion system on which the article is fixtured. Extensive programming and parameter development corroborated by metallurgical analysis is required for a metallurgically sound fusion bond without cracks. The control means includes a vision system 40 which digitizes the article configuration in order to drive the motion system holding the article beneath the focused laser beam and converged powder feed.

The control system is key to efficient and economical operation of the process allowing a variety of complex configuration to be welded. The vision system which is employed sets a precise path for the laser welding system which is individualized for the weld area of the particular article being welded. This is accomplished with a computer numerical control utilizing a program for the article, but with the precise path set by the vision system. After the article is secured in its fixture, the height is checked to ascertain the build-up needed during welding (cladding). Then after setting the contrast of the weld area, the camera of the vision system views (i.e. takes a picture of) the weld area and digitizes its periphery by tracing the periphery with a plurality of points which are numerically converted providing a precise contoured path for the laser to follow for the specific weld area of the article. After the path is set, the article still in its fixture, is then placed onto the motion system of the laser welding apparatus wherein the path of the laser is precisely set for this article. Because the path is precisely set for the specific article, less waste occurs in the welding process and reduced machining (e.g. milling, grinding) is required subsequent thereto to remove excess weldment. As a particular advantage subsequent machining can also be precisely controlled by utilizing the same fixture and control parameters for the specific article as originally set by the vision system for the laser welding. This reduces requirements for subsequent measurement and control which increases the efficiency of the process.

The motion system whose path is set by the control system is at least a 3-axis, preferably a 4 or 5-axis motion system to provide the detailed motion required for various complex welding area surfaces. The 3-axis motion would be along the X, Y and Z directions, the 4-axis motion for more complex flat surfaces would combine X, Y and Z directions with rotation (see FIG. 1), while a 5-axis motion for contoured surfaces would combine X, Y and Z directions with rotation and tilt.

Suitable lasers 11 include those known to those skilled in the art including a $CO_2$ laser. The power density of the laser may be between $10^5$ watts/in$^2$ and $10^7$ watts/in$^2$ with a beam spot size in the range of 0.050 to 0.150 inches. The powder alloy feed is operated to deliver a stream of alloy particles generally −120 to +400 mesh at a rate of 5 to 15 grams/min. Motion of the laser beam and powder feed are generally on the order of 10 to 30 inches per minute to provide the desired rate of melting of the substrate and welding on its surface.

EXAMPLE

Tips were hot welded (clad) onto Rene 80 directionally solidified turbine blades.

After placing the blade in its fixture the height was measured to determine the amount of tip build-up needed. The control system for the welding process utilized a computer numerical control with a program specific to the particular turbine blade to be welded with the precise path of the weld being controlled by use of a vision system (an Adept O.C. Controller Stand Alone Vision System) which viewed the blade tip weld area and digitized the periphery of weld area providing a specific path for the laser to follow during welding/cladding. The blade, still in its fixture, was then affixed onto the motion system and placed under the inert gas shroud. The blade was preheated by the induction coil to 1950° F. with the time taken to ramp up the blade temperature being 150 seconds. This temperature was maintained for the entire weld area and region adjacent to the weld area (i.e. about one inch) during welding and solidification of the weldment. The apparatus and process as shown in the Figures was employed utilizing a $CO_2$ laser operated at 2.6–2.8 kilowatts with a 0.100 inch spot size and a powder alloy feed comprised of Rene 80 alloy having a mesh size of −170 +325 mesh flowing at 8 to 9 grams/minute. A 4-axis motion system was utilized traveling at 18 inches/minute, with an inert gas of argon flowing into the shroud at 2.4 CFM. After welding was completed the entire weldment was uniformly cooled with a ramp down from 1950° F. to less than 1200° F. taking about 250 seconds.

The resultant welded article is then machined with the internal surface being electric discharge machined and the external surface being milled, followed by polishing as needed. Advantageously due to the precise control of the process minimal and in some cases no machining is needed minimizing waste and processing time.

What is claimed is:

1. A process for laser welding a nickel and/or cobalt based superalloy article chosen from the group consisting of a gama-prime precipitation strengthened superalloy containing titanium and aluminum in a combined amount of at least 5% and an MCrAlY alloy wherein M is nickel and/or cobalt comprising:

preheating an entire weld area and region adjacent to the weld area of the article to a ductile temperature which is above an aging temperature and below an incipient melting temperature for said superalloy and within the range of 1400° F. to 2100° F. with an induction heat coil and maintaining such temperature during welding and solidification of a weld; and welding the preheated article utilizing a laser with a powder alloy feed, with a control means preprogrammed with values for control of the laser, the powder feed and a general path for a motion system on which the article is fixtured, said values based on the configuration and composition of the article wherein the control means further includes a vision system which digitizes the weld area of the article providing a precise path for the laser welding to follow individualized for the weld area of the specific article being welded.

2. Process of claim 1 wherein the control means includes a computer numerical control.

3. Process of claim 2 wherein the motion system has at least 3-axis of motion.

4. Process of claim 3 further comprising providing an optical pyrometer to measure and control the temperature of the weld area of the article.

5. Process of claim 4 further comprising controlling temperature heat-up and cool down rates of the article to reduce strain and cracking.

6. Process of claim 5 further comprising providing an inert gas shroud during welding to shield the weld area of the article.

7. Process of claim 6 wherein the powder alloy is a gamma-prime precipitation-strengthened nickel base superalloy containing titanium and aluminum in a combined amount of at least 5% or an MCrAlY alloy wherein M is Ni and/or Co.

8. Process of claim 7 wherein the superalloy article and the powder alloy comprise substantially the same alloy.

9. Process of claim 8 wherein the article is a turbine blade, turbine vane or turbine rotor.

10. Process of claim 9 wherein the article is maintained in the same fixture for laser welding and machining and wherein the machining is controlled utilizing the same digitized information as provided by the vision system for laser welding.

11. Process of claim 7 wherein the superalloy article is a component for a gas turbine engine.

12. Process of claim 7 wherein the ductile temperature is in the range of 1725° F. to 1975° F.

13. Process of claim 7 wherein the superalloy article is directionally solidified.

14. Process of claim 2 wherein the motion system has 4-axis of motion.

15. Process of claim 2 wherein the motion system has 5-axis of motion.

16. Process of claim 2 further comprising machining the welded article.

17. Process of claim 1 wherein the vision system digitizes the precise path for the laser welding to follow for the specific article prior to preheating the article.

18. A laser welding apparatus for welding superalloy articles comprising:

an induction heating coil for heating a weld area and adjacent region of the article to 1400° F. to 2100° F. and maintaining such temperature during welding and solidification of a weld;

a laser with a powder feed system for welding the article;

a motion system having at least 3-axis of motion on which the article is fixtured; and a control means preprogrammed with values for control the laser, the powder feed and a general path for a motion system, said values based on the configuration and composition of the article to provide a weld on a predetermined surface area of the article, wherein the control means further includes a vision system which digitizes the weld area of the article providing a precise path for the laser welding to follow individualized for the weld area of the specific article being welded.

19. Apparatus of claim 18 wherein the control means includes a computer numerical control.

20. Apparatus of claim 19 further comprising a means to control temperature and heat-up and cool down rates of the weld area of the article.

21. Apparatus of claim 20 wherein the motion system has 4-axis of motion.

22. Apparatus of claim 20 wherein the motion system has 5-axis of motion.

23. Apparatus of claim 18 further comprising an optical pyrometer to measure the temperature of the article.

24. Apparatus of claim 23 further comprising a gas shroud to shield the weld area of the article with inert gas during welding.

25. Apparatus of claim 18 wherein the vision system digitizes the precise path for the laser welding to follow for the specific article prior to heating the article.

* * * * *